Oct. 1, 1940.  A. E. DENTLER  2,216,231
SHOCK ABSORBER
Filed Dec. 8, 1937  2 Sheets-Sheet 1
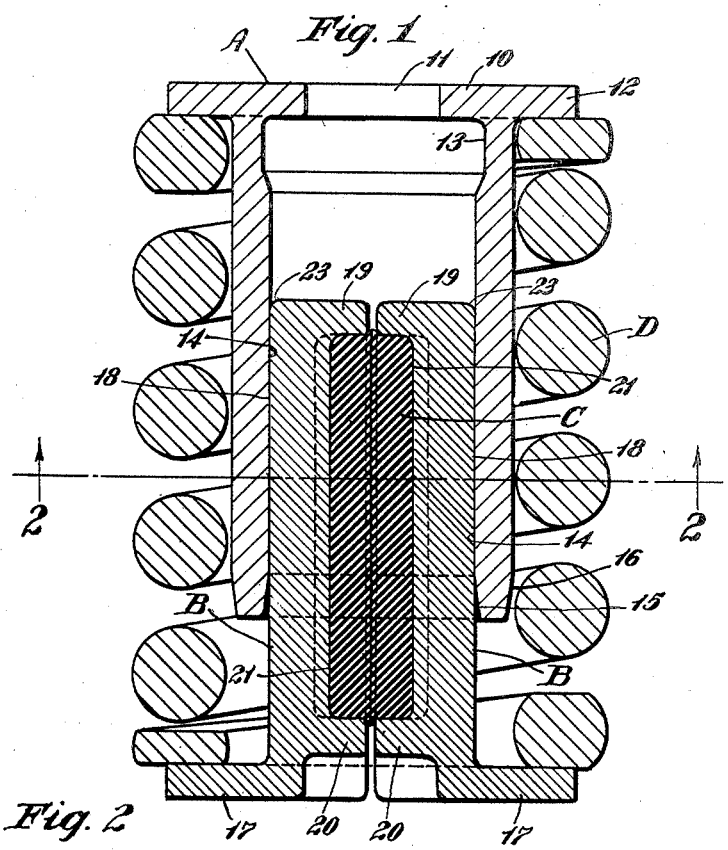
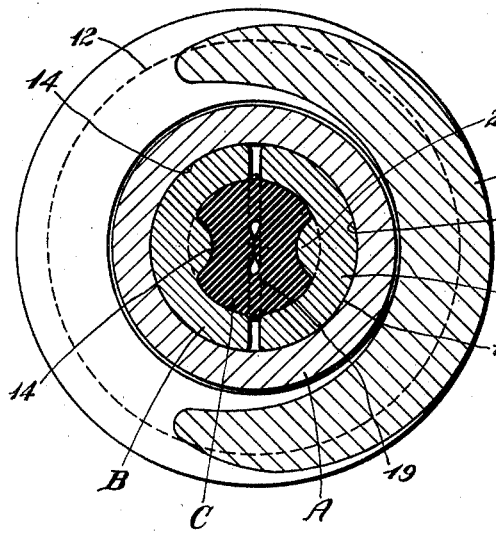
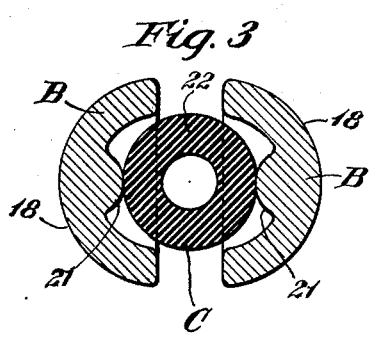
Inventor,
Arnold E. Dentler
By Henry Fuchs
Atty.

Inventor
Arnold E. Dentler
By Henry Fuchs
Atty.

Patented Oct. 1, 1940

2,216,231

UNITED STATES PATENT OFFICE 2,216,231

SHOCK ABSORBER

Arnold E. Dentler, Hinsdale, Ill., assignor to W. H. Miner, Inc., Chicago, Ill., a corporation of Delaware Application December 8, 1937, Serial No. 178,691

13 Claims. (Cl. 267—9)

This invention relates to improvements in shock absorbers especially adapted for use as snubbing devices in connection with springs for railway cars.

One object of the invention is to provide a shock absorber of simple design, especially adapted for use as a snubber for dampening the action of truck springs of railway cars and replacing at least one of the coil springs of the usual set of springs employed in each cluster of such car trucks.

A more specific object of the invention is to provide a snubber of the character described in the preceding paragraph providing frictional resistance, wherein the resistance offered is substantially uniform throughout the action of the device.

A still further object of the invention is to provide a snubber for truck springs of railway cars in the form of a friction shock absorbing mechanism having relatively movable friction elements which are actuated during both compression and expansion of the truck springs, wherein the friction elements are held in frictional contact by the expansive action of the deformed rubber pressure transmitting element which is at all times under compression.

Yet another object of the invention is to provide a friction shock absorbing mechanism of the character described in the preceding paragraph wherein the friction elements comprise a casing having interior friction surfaces and friction shoes telescoped within the casing and held in frictional contact therewith by a rubber core embraced by the shoes, which core is placed under an initial predetermined compression and constantly held under such compression by the assembled casing and shoes.

Other objects of the invention will more clearly appear from the description and claims hereinafter following.

Figure 4:
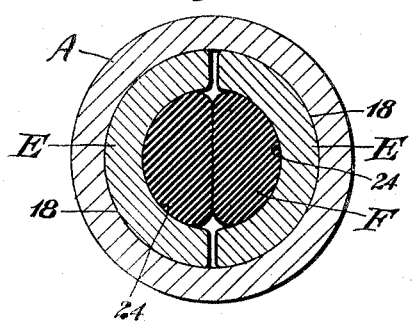
Figure 5:
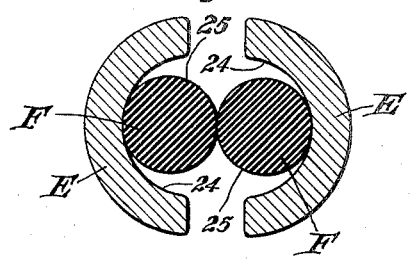
Figure 6:
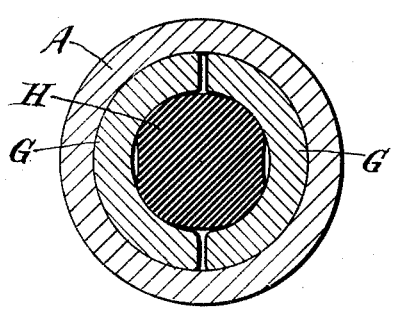
Figure 7:
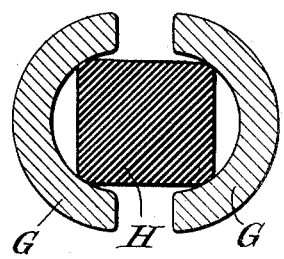
Figure 8:
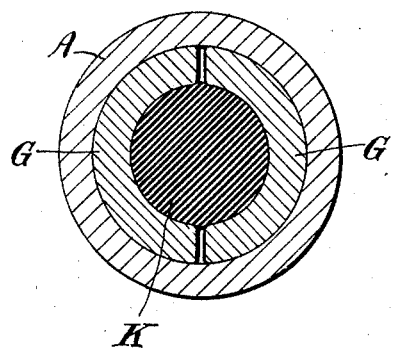
Figure 9:
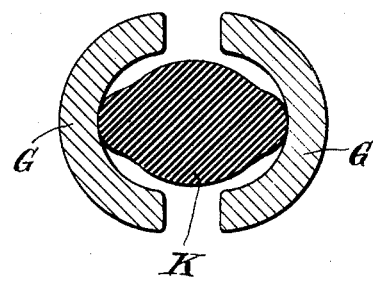

In the drawings forming a part of this specification, Figure 1 is a vertical sectional view of the improved snubber. Figure 2 is a horizontal sectional view corresponding substantially to the line 2—2 of Figure 1. Figure 3 is a horizontal sectional view similar to Figure 2 showing only the friction shoes and rubber core of the device and illustrating the condition of these parts before being assembled with the other parts of the snubber. Figure 4 is a horizontal sectional view of the casing, friction shoes and rubber core of another embodiment of the invention. Figure 5 is a horizontal sectional view similar to Figure 4 showing the friction shoes and rubber core only of the device illustrated in Figure 4 and indicating the condition of these parts before being assembled with the other parts of the snubber. Figures 6 and 7 are views respectively similar to Figures 4 and 5, illustrating still another embodiment of the invention. Figures 8 and 9 are views respectively similar to Figures 4 and 5, illustrating a further embodiment of the invention.

Referring first to the embodiment of the invention illustrated in Figures 1, 2, and 3, my improved snubber or shock absorber comprises broadly a friction casing A; a pair of friction shoes B—B telescoped within the casing; a rubber core C embraced between the friction shoes; and a spring resistance D.

The friction casing A is in the form of a substantially cylindrical tubular member open at the inner or bottom end and closed by a transverse end wall 10 at the outer or upper end, said wall being provided with a central opening 11. The wall 10 projects outwardly beyond the body portion proper of the casing, providing a laterally projecting annular flange 12 which forms an abutment for the upper end of the spring resistance D. The casing A is of enlarged internal diameter at its upper end, as indicated at 13, and the remaining section of the casing outwardly of or below said enlarged interior section provides transversely curved interior friction surfaces 14—14 with which the shoes B—B cooperate. The interior wall of the casing is outwardly flared at its lower end, thereby providing a short tapered end section 15 for a purpose hereinafter described. At the open end portion thereof, the casing is also exteriorly beveled, thereby providing a short end section 16, which is exteriorly tapered for a purpose hereinafter pointed out.

The friction shoes B—B are of similar design, each comprising a main body portion having a laterally projecting horizontal base flange 17 which serves as an abutment for the lower end of the spring resistance D. The body portion of the shoe B is of generally curved cross section, as clearly shown in Figures 2 and 3, and presents an outer friction surface 18 corresponding in curvature to the interior friction surface 14 of the casing A and slidably engaging the same. At the upper end and adjacent the lower end, the shoe B has inwardly projecting horizontal flanges 19 and 20, the lower flange 20 being spaced above the lower end of the shoe. The interior vertical wall of the body of the shoe between the flanges 19 and 20 is transversely curved or concave and provided with a centrally located, vertically disposed rib 21, which is preferably rounded as shown, thus presenting a convex projection.

The shoes B—B are telescoped within the casing A and are preferably diametrically opposite.

The rubber core C occupies the space between the shoes B—B and holds the latter expanded. The core C is in the form of a tubular member which is deformed to the cross sectional shape shown in Figure 2 when the shoes are in position telescoped within the casing A. The rubber core C before being deformed, as shown in Figure 3, is in the form of a hollow cylinder 22 having relatively thick walls. The cylinder 22 corresponds in length to the spacing between the flanges 19 and 20 of the shoes B—B so that it is snugly embraced by these flanges when the parts are assembled.

The spring resistance D is in the form of a coil spring member, surrounds the casing A, and has its opposite ends bearing respectively on the flange 12 of the casing A and the flanges 17—17 of the shoes B—B.

As will be understood by those versed in this art, the snubbing device shown in Figures 1 and 2 is substituted for one of the spring coils or sets of coils of a cluster of truck springs of a railway car and cooperates with the top and bottom spring follower plates of the spring cluster. The snubbing device is thus compressed between the body and truck bolsters of the car together with the other springs of said cluster. Although it is preferable to substitute the snubber for one coil or set of coils of the cluster of springs, the use thereof is not limited thereto and such snubbers may be substituted for more than one spring or set of springs, as found desirable.

In assembling my improved snubber, the casing A is first telescoped over the spring D, as shown in Figure 1. As will be evident, the tapered end 16 of the casing facilitates entering the same within the coil. The tubular rubber cylinder 22 is then placed between the shoes B—B, as shown in Figure 3, and the shoes are pressed together to contract the assembled unit to reduce the same to such a diameter that it may be assembled with the casing A. When thus contracted, this unit comprising the shoes B—B and the core C is telescoped within the casing A, as shown in Figure 1. As will be evident, the flared or tapered mouth or open end of the casing A facilitates telescoping of the casing over the shoes, the outer upper corners of the shoes being preferably rounded off, as indicated at 23—23, to further facilitate this assembling operation. The tapered arrangement of the casing mouth also serves to further compress or contract the unit comprising the shoes B—B and the core C as the unit is pushed into the casing. In contracting the unit as hereinbefore described, the tubular rubber cylinder 22 is deformed from the cross sectional shape shown in Figure 3 to that shown in Figure 2, the ribs 21—21 of the shoes B—B pressing diametrically opposite sides of the cylinder into the bore of the same, the flow of the material substantially closing said bore, as shown in Figure 2. As is evident, the inherent tendency of the rubber core C to return to its cylindrical shape constantly exerts outward pressure on the shoes B—B, forcing the same into tight frictional contact with the walls of the casing A.

Upon reference to Figure 2, it will be seen that the opposed edges of the shoes B—B are spaced apart slightly when the device is completely assembled. The clearance thus provided permits contraction of the unit comprising the shoes B—B and core C to an extent to be properly accommodated within the casing A without any danger of the parts binding, which might occur if contraction of the unit were unduly limited by contact of the shoes with each other. The clearance referred to also provides additional space for the flow of the material of the tubular core as clearly shown in Figure 2.

In the operation of my improved snubber, as shown in Figures 1 and 2, upon the springs of the spring cluster of the truck of a railway car being compressed, the friction shoes B—B will be forced inwardly of the friction casing A, opposed by the spring D. Due to the friction existing between the friction shoes and the friction surfaces of the casing A, relative movement of these parts is frictionally opposed and the action of the springs of the cluster effectively snubbed. Oscillation of the springs of the cluster is reduced to a minimum by this snubbing action. When the coils of the truck spring cluster expand and the spring follower plates of said cluster are moved apart, the friction shoes B—B and the casing A will also be forced apart by the expansive action of the spring D which reacts against the flange 12 of the casing A and the flanges 17—17 of the shoes.

Referring next to the embodiment of the invention illustrated in Figures 4 and 5, the friction shoes, which are indicated by E—E, and the rubber core, which is indicated by F, differ from the shoes B—B and the core C hereinbefore described. Otherwise the structure of the snubber in Figures 4 and 5 is identical in structure with the snubber shown in Figures 1 and 2 and operates in the same manner. As shown in Figure 4, the shoes E—E are telescoped within the casing A and have exterior curved friction surfaces identical with the friction surfaces 18—18 of the shoes B—B. These friction surfaces of the shoes E—E are also indicated by 18—18. The casing A shown in Figure 4 is identical with the casing A shown in Figures 1 and 2 having interior friction surfaces on which the shoes slide.

The shoes E—E present transversely curved surfaces 24—24 on their inner sides, the curvature of which is uninterrupted from side to side of each shoe, thus providing concave engaging faces which embrace and bear on the core F.

The core F is composed of two solid rubber cylinders 25—25, as shown in Figure 5, which, when the unit comprising the shoes and core is contracted, assume the distorted shape shown in Figure 4. The cylinders 25—25 are preferably of such a size in cross section that, when distorted by being compressed between the shoes E—E, clearance is provided between the core and the shoes at and immediately adjacent the line of division between the shoes, so that there is no danger of the material of the core being pinched between said shoes.

Referring next to the embodiment of the invention illustrated in Figures 6 and 7, the friction shoes which are indicated by G—G are identical with the shoes E—E of Figures 4 and 5 and cooperate with the friction casing A in a like manner. As shown in Figure 6, a solid rubber core H is embraced by the shoes G—G. This core, as shown in Figure 7, is of rectangular cross section before contraction of the unit comprising the core and the shoes G—G, and is distorted to assume the cross sectional shape shown in Figure 6 when the unit is contracted. The tendency of the core to return to its rectangular cross section presses the shoes against the friction surface of the enclosing casing in a manner similar to the rubber cores shown in Figures 1, 2, and 3 and Figures 4 and 5. The structure and operation of the form of the invention shown in Figures 6 and 7 is otherwise identical with that of the structures hereinbefore described.

Referring next to the embodiment of the invention illustrated in Figures 8 and 9, the structure is identical with that involved in Figures 6 and 7 with the exception that a core of somewhat different cross section is employed. The core, which is indicated by K in Figures 8 and 9, is in the form of a solid rubber block and is of the cross section shown in Figure 9 before distortion. As shown in Figure 8, the block K assumes a substantially cylindrical shape in cross section when distorted by contraction of the unit comprising the core and the shoes, which shoes are indicated by G—G. As will be evident upon reference to Figure 9, the cross sectional contour of the core K is of generally oval form, the oval having elongated ends coincident with the greatest axis thereof. Thus the core K presents longitudinally extending projecting sections or ribs which are adapted to be forced inwardly when the shoes are pressed together in contracting the unit. The tendency of the distorted core K to return to its original shape presses the shoes against the friction surfaces of the casing. The structure and operation of this form of the invention is otherwise the same as that of the structures hereinbefore described.

From the preceding description taken in connection with the drawings, it will be evident that I have provided exceptionally efficient and simple means for effectively snubbing the action of car truck springs, wherein the pressure is uniformly distributed over the entire length of the friction shoes, thereby assuring smooth action and efficient performance.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism the combination with a cylindrical friction casing; of a pair of opposed friction shoes of curved cross section within the casing in sliding engagement with the curved friction surfaces of the latter, said shoes having inwardly projecting portions on the inner sides thereof; and an initially cylindrical tubular core embraced between said shoes and held between said shoes in compressed deformed non-cylindrical shape by the projecting portions of said shoes; and means yieldingly opposing relative movement of the casing and shoes.

2. In a friction shock absorbing mechanism, the combination with a cylindrical friction casing; of opposed friction shoes having sliding contact with the interior of said casing; longitudinal interior ribs on said shoes; a rubber core embraced by said shoes, said core being held in distorted condition between said shoes, said core due to its tendency to return from distorted condition to its normal condition forcing said shoes into tight frictional contact with the casing, said core being initially of true cylindrical tubular shape and being held compressed into non-cylindrical shape by the ribs on said shoes; and means for yieldingly opposing relative movement of the casing and shoes.

3. In a friction shock absorbing mechanism, the combination with a cylindrical friction casing; of opposed friction shoes telescoped within the casing; a distorted rubber core embraced by said shoes and pressing the same outwardly against the friction surfaces of the casing, said core comprising a pair of solid rubber cylinders distorted to non-cylindrical shape; and means opposing relative movement of the casing and shoes.

4. In a friction shock absorbing mechanism, the combination with a cylindrical friction casing having longitudinally extending interior friction surfaces; of opposed friction shoes within the casing in sliding frictional contact with the interior surfaces of the casing, said shoes being of curved transverse cross section; a distorted rubber core embraced by said shoes and pressing the same outwardly against the friction surfaces of the casing, said core comprising a pair of solid rubber cylinders pressed together between said shoes and distorted to non-cylindrical shape; and means opposing relative movement of the casing and shoes.

5. In a friction shock absorbing mechanism, the combination with a cylindrical casing having longitudinally extending interior friction surfaces; of opposed friction shoes within the casing in sliding frictional contact with the friction surfaces of the casing, said shoes being of curved transverse cross section; a distorted rubber core embraced by said shoes and pressing the same outwardly against the friction surfaces of the casing, said core comprising a block of non-circular cross section distorted from said non-circular shape by inward pressure of said shoes; and means yieldingly opposing relative movement of said casing and shoes.

6. In a friction shock absorbing mechanism, the combination with a cylindrical friction casing having longitudinally extending interior friction surfaces; of opposed friction shoes within the casing in sliding frictional contact with the interior surfaces of the casing, said shoes being of curved transverse cross section; a distorted rubber core embraced by said shoes and pressing the same outwardly against the friction surfaces of the casing, said core comprising a block of originally angular cross section compressed and distorted to non-angular shape between the curved inner sides of said shoes; and a spring opposing relative movement of the casing and shoes.

7. In a friction shock absorbing mechanism, the combination with a cylindrical friction casing having longitudinally extending interior friction surfaces; of opposed friction shoes within the casing in sliding frictional contact with the interior surfaces of the casing, said shoes being of curved transverse cross section; a distorted rubber core embraced by said shoes and pressing the same outwardly against the friction surfaces of the casing, said core comprising a rubber block originally of rectangular cross section compressed and distorted to non-rectangular shape between the curved inner sides of said shoes; and spring means opposing relative movement of the casing and shoes.

8. In a friction shock absorbing mechanism, the combination with a friction casing having longitudinally extending interior friction surfaces; of elongated friction shoes telescoped within the casing and having lengthwise sliding contact with the interior surfaces of the casing, said shoes being confined against lateral separation by the casing; an elongated laterally contracted and compressed rubber core extending lengthwise of and embraced between said shoes and maintained under compression by said shoes being confined between the walls of said casing, the inherent resiliency of said compressed core reacting against the shoes to hold the latter in tight frictional contact with the casing, said core in its normal uncompressed state being of a different exterior contour than the interior sides of said shoes; and spring means opposing relative longitudinal movement of the casing and shoes.

9. In a friction shock absorbing mechanism, the combination with a friction casing; of friction shoes slidably mounted within said casing; a rubber core embraced by said shoes and compressed therebetween, the peripheral surface of the uncompressed core and the inner surfaces of said shoes being of different contour circumferentially to provide clearance for flow of the material of said core when under compression between the shoes; and means yieldingly opposing relative sliding movement of the shoes and casing.

10. In a friction shock absorbing mechanism, the combination with an elongated casing having interior, longitudinally extending friction surfaces; of elongated friction shoes extending lengthwise of the casing and having sliding contact with the friction surfaces of said casing, said shoes having opposed interior faces; means for spreading said shoes apart, comprising an elongated rubber core, interposed between said shoes and embraced by said interior faces of the shoes, said interior faces of the shoes and the corresponding sides of the core being of different transverse contour, said core being compressed transversely and held in laterally distorted compressed condition between said shoes, the inherent tendency of said core to return to its normal uncompressed shape reacting against said shoes to press the latter laterally outwardly in tight frictional contact with the casing; and means yieldingly opposing relative movement of the casing and shoes.

11. In a friction shock absorbing mechanism, the combination with an elongated casing; of a friction unit within the casing having sliding frictional engagement with the interior surfaces of the walls of said casing, said unit including a rubber core and friction shoes, said core being elongated and extending lengthwise of the casing, said shoes being elongated, extending lengthwise of the casing, and being held pressed together by said enclosing casing, said core being enclosed by said shoes, the interior faces of the enclosing portions of the shoes being of a transverse contour different from the contour of the corresponding sides of the core, said core being held compressed transversely between said shoes and distorted by said shoes being confined by said casing, the inherent resiliency of the core to expand laterally and return to its uncompressed shape pressing said shoes into frictional contact with the casing; and yielding means opposing relative movement of the casing and shoes.

12. In a friction shock absorbing mechanism, the combination with a friction casing; of a friction unit within the casing and slidable lengthwise of the same, said unit including only a rubber core and friction shoes embracing said core, said shoes having opposed interior faces, said core being of cylindrical tubular shape, the interior faces of said shoes differing in contour from the corresponding side faces of the core, said unit being held in contracted condition within the casing by pressing said shoes together, said tubular rubber core being held in distorted condition by said shoes when said unit is in contracted condition, whereby the inherent tendency of said rubber core to return to its cylindrical shape presses said shoes into tight frictional contact with said casing; and means yieldingly resisting relative movement of the casing and shoes.

13. In a friction shock absorbing mechanism, the combination with a friction casing; of opposed friction shoes within said casing, said shoes having sliding contact with the interior surfaces of the casing walls, said shoes having opposed interior faces; means comprising only a distorted rubber core for forcing said shoes laterally apart, said core being initially a cylindrical tube held in distorted condition between said shoes, said interior faces of the shoes being of different transverse contour than the surface of said core; and means opposing relative movement of the shoes and casing.

ARNOLD E. DENTLER.